United States Patent Office.

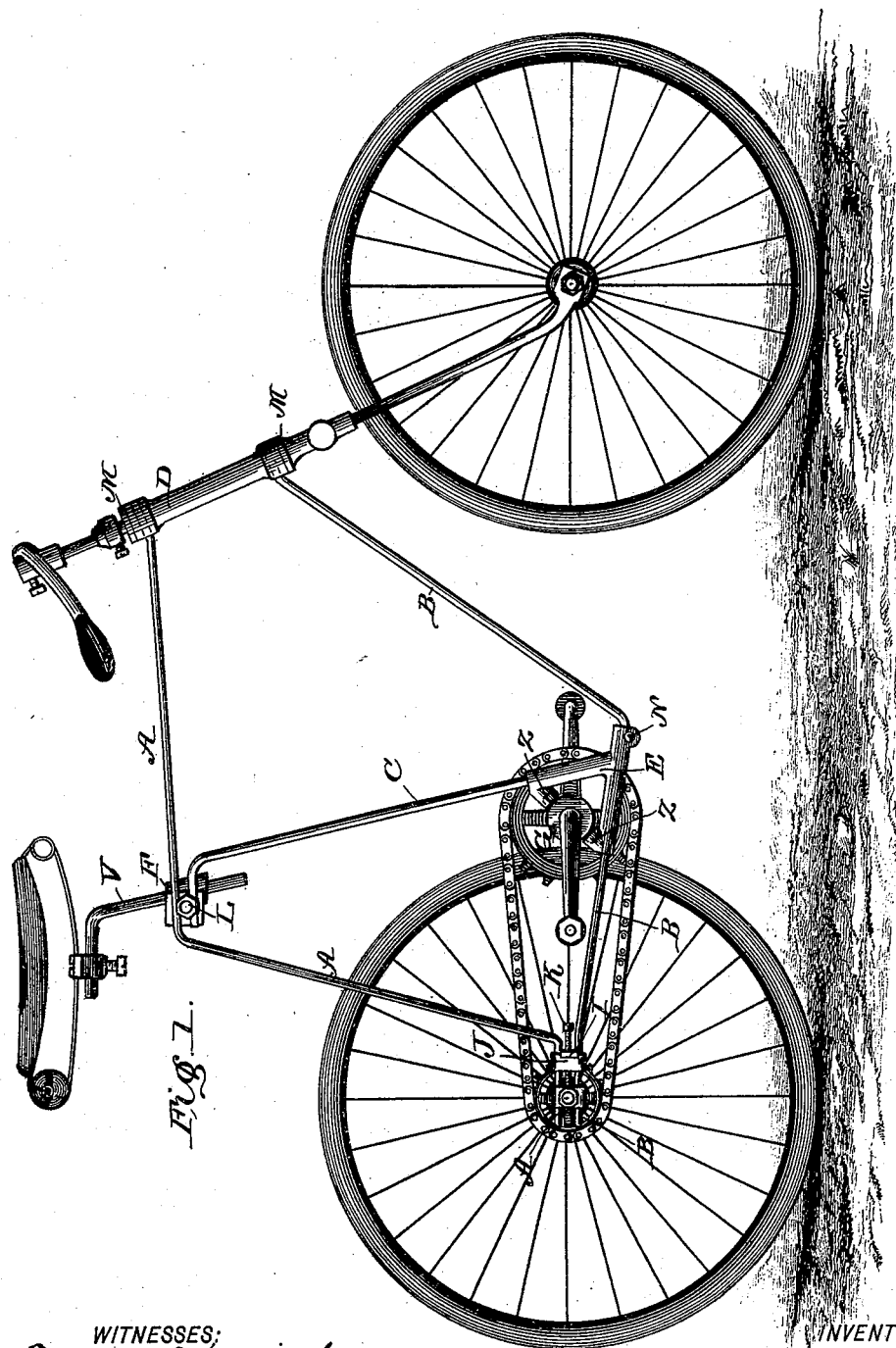

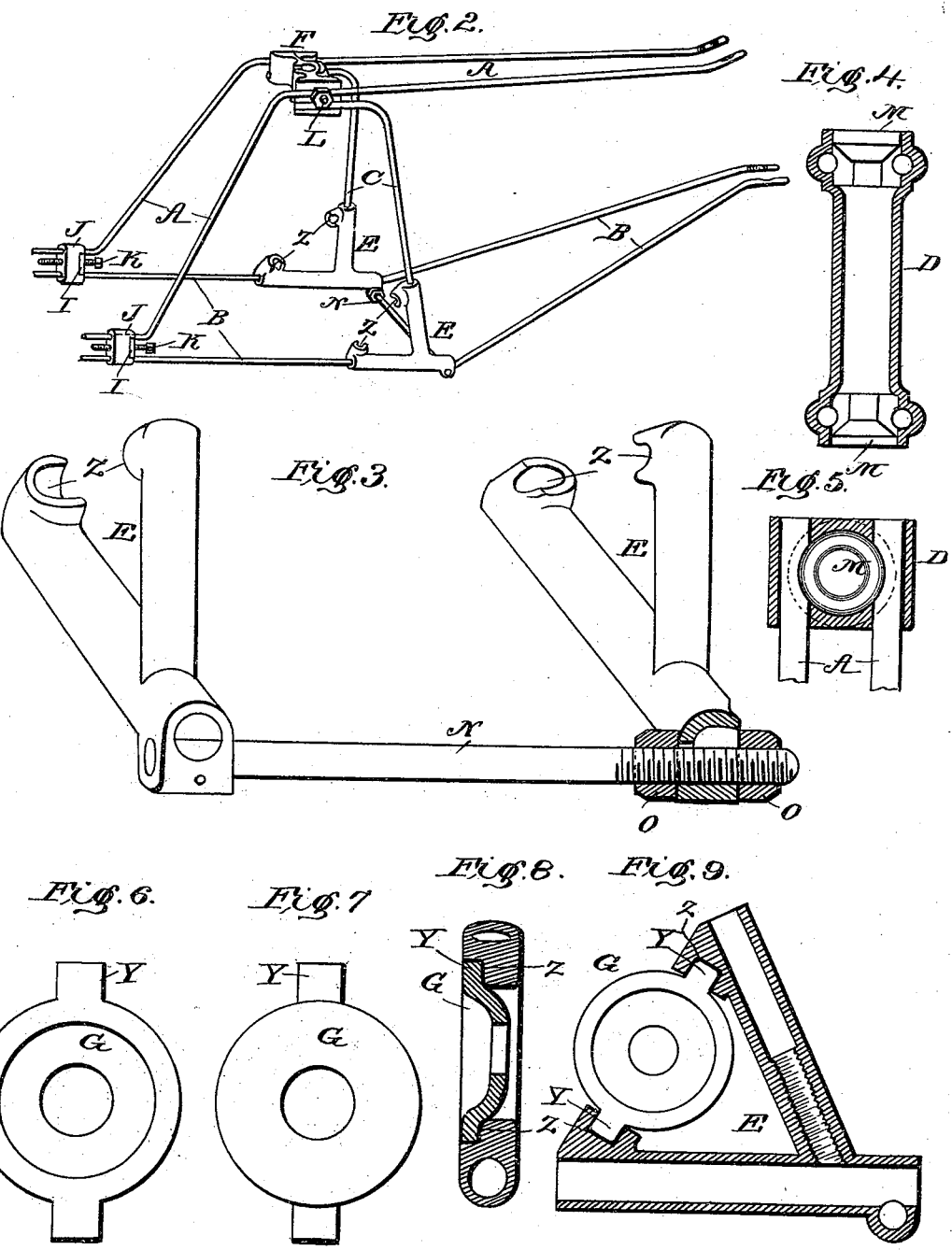

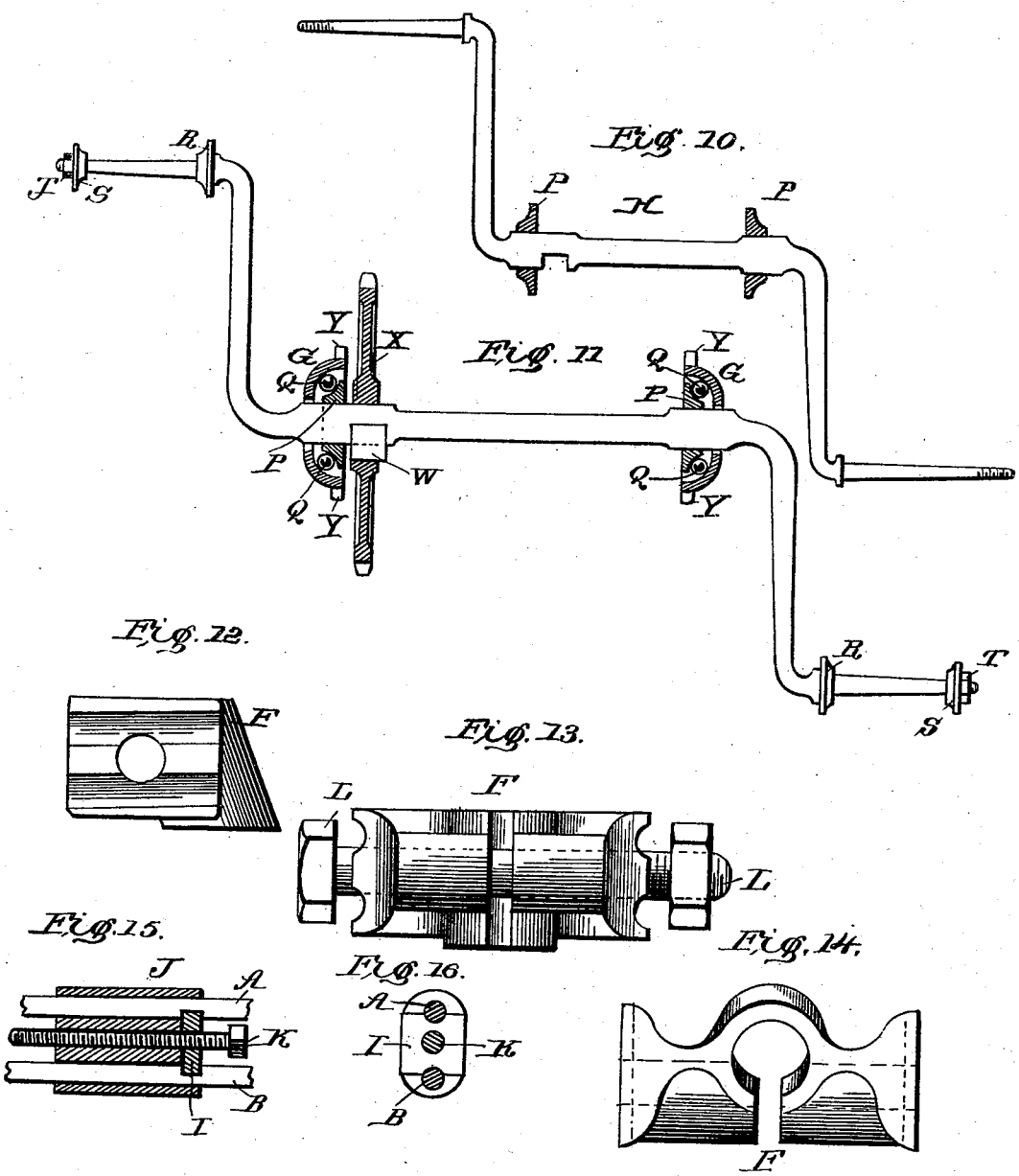

SAMUEL A. DONNELLY, OF CHICAGO, ILLINOIS.

BICYCLE.

SPECIFICATION forming part of Letters Patent No. 506,105, dated October 3, 1893.

Application filed September 30, 1892. Serial No. 447,445. (No model.)

*To all whom it may concern:*

Be it known that I, SAMUEL A. DONNELLY, a citizen of the United States, residing at Chicago, county of Cook, State of Illinois, have invented a new and useful Bicycle, of which the following is a specification.

My invention consist in a new and useful improved bicycle in which are comprised many simple and valuable features combining to produce a bicycle which is very light and strong in its construction and which will give the highest degree of ease and comfort in use and my invention will be hereinafter fully described and claimed.

Referring to the accompanying drawings, Figure 1. is a side view of my new and improved bicycle. Fig. 2. is a perspective view of the diamond frame before entering the socket head of my machine. Fig. 3. is a front perspective view partly in section of the Y shaped connection fittings in their relative positions. Fig. 4. is a rear section view of the socket head of the diamond frame. Fig. 5. is a top section view of the frame head, bearing case and reach rods. Fig. 6. is an inside view of crank axle bearing box. Fig. 7. is an outside view of crank axle bearing box. Fig. 8. is a section view of bearing box and the Y shaped fittings in their relative positions with each other. Fig. 9. is a side section view of the Y shaped fittings and inside view of bearing as fitted in Y shaped fittings. Fig. 10. is a side view of my one piece driving rod with section view of cones thereon. Fig. 11. is a side view of cranks and section view of relative position bearings. Fig. 12. is a side view of grooved clamp block. Fig. 13. is a rear view of grooved clamp block, and relative position of the coupling bolt. Fig. 14. is a top view of grooved clamp block. Fig. 15. is a side section view of the link shaped fittings, the frame rods, the connecting screw and end view of key. Fig. 16. is an end view of link shaped fitting and side view of key.

The same letters of reference indicate corresponding parts in all the figures.

Referring to the several parts by their designating letters. Fig. 1. indicates the diamond frame of my new and improved bicycle. This frame as well as other parts of my bicycle, which will be hereinafter described, is formed of the round rods, the two top and lower rods extending from rear to front through all fittings, and the upright rod C from the top rods to the bottom rods. This construction gives great strength and rigidity with a light weight of metal, as will be readily seen, thereby decreasing the weight of the entire bicycle, while adding to its strength, rigidity, and durability. I construct the entire double diamond frame of my bicycle of six pieces or lengths of round rods, the rods A extending from the rear through the link shaped fittings J. upward to the grooved clamp block F. and clamped in the upper grooves of same by the coupling bolt L, then forward to the socket head D. and inserted into the upper side holes of the head D. The bottom rods B extending from the rear through the link shaped fittings J. forward through the Y shaped fittings E and upward to the head D. then inserted into the lower side holes of the head D. The upright rod C. screws into the Y shaped fittings E. against the bottom rods B. extends upward and is then bent to engage the lower grooves of clamp block F. and clamped by the coupling bolt L. After the rear of the top rods A. and bottom rods B. are fitted through the link shaped fittings J. a slot is sawed or filed crosswise of rods A. and B. between which the key I. is driven, then the link shaped fittings J. and key I. are tapped together making one continuous thread throughout which screw K. couples together and adjusts the rear wheel in the slot that consists of the rear ends of the rods A. and B. The rods A and C are placed within the grooves on the side of clamp block F and the saddle post V. within the upright hole with the slot to the rear of the same are all firmly secured by the coupling bolt and nut L. The front ends of the rods A. and B enter the four holes on the sides of the socket head D. Then by counterboring the top and bottom of head D. the rods A. and B. are partly cut away thereby allowing of bearing case M. to be driven into the head D. and between rods A and B. thereby securing the rods A. and B. within the head D. as indicated in Fig. 5.

Within the Y shaped fittings E. are chambers through which the rods B. extend and the rods C. are screwed against the rods B.

thereby securing the Y shaped fittings E. in their relative position. At the front ends of fittings E. are holes into which one end of stud screw N. is driven and secured by a pin. The other end is secured in the opposite hole by the nuts O. as indicated in Fig. 3. The purpose of these peculiar Y shaped fittings E. having the seats Z. and stud N. will be hereinafter described.

The Fig. 10. indicates a bent driving rod which consists of a crank axle, cranks and pedal axles all in one piece and designated by letter H, and said axle is largest in diameter at the position on which the cones P and sprocket X. are placed, so that they may pass over all parts to said position as indicated on Figs. 10 and 11.

Referring to Fig. 11, I get my several parts in position as follows: First I place my sprocket wheel X. in position which has a keyway as large in width and depth as the shaft H is in diameter. Therefore, it may pass over the bends and several parts very easy. Then it is driven on the pieces H. and W. into position. Next I drive my cones P. into their relative position. Then the bearing boxes or cases G. are placed in their relative position with the balls Q. to operate as bearings on the cones P. The cones R and S and lock nut T are then placed in their relative positions to constitute bearings for pedals. I now have my several parts in position to place them into their position into the frame. I screw off the outer nut of the nuts O. as indicated in Figs. 2 and 3, then widen out the frame at the point where the stud N. is placed. I next place the lugs Y of the bearing boxes G. into the seats Z. of the Y shaped fittings E. Then I close up the frame and screw on the outer nut of the nuts O. which now serve as adjusting nuts for the bearings P. G. and Q.

From the foregoing description, taken in connection with the accompanying drawings, the construction and advantages of my invention will be readily understood.

It will be seen that my new and improved bicycle is exceedingly light and strong while the frame is peculiarly adapted for the simplified driving gear, which parts are most liable to get loose in bicycles, and it is also stronger owing to fewer connections.

Having thus described my invention, what I claim, and desire to secure by Letters Patent, is—

1. In a bicycle, the diamond-shaped frame formed of four metal rods bent to form a double-diamond frame and having their rear ends arranged approximately parallel, and link shaped fittings upon said rods in advance of their rear extremities substantially as set forth.

2. In a double diamond frame formed of the four metal rods A. and B. connected by an upright brace rod C. the Y shaped fittings E. the rod N connecting the opposite fittings E and the clamp block F. substantially as set forth.

3. The combination in a bicycle of the frame connected together by the link shaped fittings J. the Y shaped fittings E. the grooved clamped block F and the socket head with the side holes therein D. substantially as set forth.

4. In a machine substantially as described a clamp block F provided between its ends with a split socket for the saddle post and in its ends with seats for the frame rods and a longitudinal bolt whereby to clamp said post and frame rods to the block all substantially as set forth.

5. The combination in a bicycle frame of the rear ends of the frame being secured in their position by the link shaped fittings J. the key I. and the screw K substantially as set forth.

6. In a bicycle, the combination of the frame rods entering and extending through the side holes of the socket head D. and secured by the bearing case M. being driven between the rods A. and B. in the socket head D. substantially as set forth.

7. In a bicycle, the combination of the bearing box G. having the lugs Y. thereon fitted into the seats Z. of the Y shaped fitting E. substantially as set forth.

8. In a bicycle the combination of the driving rod H. the fixed cones P the balls Q. and the bearing box G having the lugs Y. thereon seated into the seats Z of the Y shaped fittings E. and secured in the seats Z. by the threaded stud N. with the adjustable nuts O. substantially as set forth.

9. In a bicycle the combination of the tubular head provided with the opposite openings for the frame rods, the frame rods fitted in said openings and a bearing case fitted in the head between the said rods substantially as set forth.

10. In a bicycle the combination with the diamond frame of the drive shaft arranged within said frame—that is to say between the upper and lower rods thereof and bearings for said shaft substantially as set forth.

11. In a bicycle the combination with the frame rods and the fittings E receiving the same and provided with lateral inwardly facing seats of the bearing box G having studs or portions fitting in said seats substantially as set forth.

12. In a bicycle the combination with the frame rods and the Y shaped fitting E of the drive shaft, and the supports for said shaft held in the yoke of the Y shaped fitting and between the upper and lower rods of the frame all substantially as set forth.

13. In a bicycle substantially as described the combination of the frame rods, the wheel box sliding upon said rods, the fitting J fitted upon said rods, the nut I engaged with the frame rods and the bolt K threaded in said nut and engaging the wheel box substantially as set forth.

14. In a bicycle a drive shaft having integral with it the opposite end cranks provided between its ends with seats for the fixed cones P and having said seats made equal to or larger than any portion of the drive shaft between them and the extremities of the drive shaft whereby the parts may be assembled all substantially as and for the purposes set forth.

15. In a bicycle the combination of the head, the saddle supporting fitting, the fittings supporting the drive shaft the diamond frame having its upper rod lapped alongside the head and saddle supporting fitting and clamped thereto and its lower frame rods lapped alongside the head and extended thence back through and rearwardly beyond the fittings supporting the drive shaft, and the rods C all substantially as and for the purposes set forth.

SAMUEL A. DONNELLY.

Witnesses:
W. VANDERPOEL,
BASTIAN LENHEER.